United States Patent
Guo et al.

(10) Patent No.: US 10,430,514 B2
(45) Date of Patent: Oct. 1, 2019

(54) METHOD AND TERMINAL FOR EXTRACTING WEBPAGE CONTENT, AND NON-TRANSITORY STORAGE MEDIUM

(71) Applicant: TENCENT TECHNOLOGY (SHENZHEN) COMPANY LIMITED, Shenzhen (CN)

(72) Inventors: Xinhua Guo, Shenzhen (CN); Ke Su, Shenzhen (CN); Ning Ma, Shenzhen (CN); Jingyao Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 410 days.

(21) Appl. No.: 15/175,093

(22) Filed: Jun. 7, 2016

(65) Prior Publication Data
US 2016/0283461 A1    Sep. 29, 2016

Related U.S. Application Data

(63) Continuation of application No. PCT/CN2015/073167, filed on Feb. 16, 2015.

(30) Foreign Application Priority Data

Feb. 26, 2014 (CN) .......................... 2014 1 0067190

(51) Int. Cl.
  *G06F 17/27* (2006.01)
  *G06F 16/93* (2019.01)
  *G06F 16/958* (2019.01)

(52) U.S. Cl.
  CPC ............ *G06F 17/272* (2013.01); *G06F 16/93* (2019.01); *G06F 16/958* (2019.01)

(58) Field of Classification Search
  CPC ...... G06F 17/24; G06F 17/241; G06F 17/212; G06F 17/248; G06F 17/2241; G06F 17/30011; G06F 17/211; G06F 17/278
  See application file for complete search history.

(56) References Cited

U.S. PATENT DOCUMENTS

| 8,490,148 B2 * | 7/2013 | Sikka ................... H04L 63/20 715/700 |
| 2007/0226314 A1 * | 9/2007 | Eick .................. G06F 17/30896 709/217 |

(Continued)

FOREIGN PATENT DOCUMENTS

| CN | 101715004 A | 5/2010 |
| CN | 102184184 A | 9/2011 |

(Continued)

OTHER PUBLICATIONS

Office Action in CN Application No. 201410067190.9 dated Apr. 26, 2017, 7 pages.

(Continued)

*Primary Examiner* — Angelica Ruiz
(74) *Attorney, Agent, or Firm* — Brinks Gilson & Lione

(57) ABSTRACT

A method, a terminal and a non-transitory storage medium for extracting webpage content includes: responding to a webpage browsing instruction triggered on a browser by a mobile client to obtain a corresponding webpage; parsing the webpage to obtain a DOM node of a tag in a webpage script; obtaining a plug-in tag node from the DOM node; and when a plug-in tag corresponding to the plug-in tag node is a predetermined type tag, extracting a plug-in resource that corresponds to the plug-in tag. The present method can complete extracting of content that complies with a specific protocol specification when a webpage has not been truly rendered, thereby improving a speed of extracting predeter- (Continued)

mined webpage content and also improving a webpage display speed.

12 Claims, 8 Drawing Sheets

(56) References Cited

U.S. PATENT DOCUMENTS

| | | | | |
|---|---|---|---|---|
| 2012/0210205 A1* | 8/2012 | Sherwood | ......... | G06F 17/30058 715/234 |
| 2012/0240053 A1* | 9/2012 | Shriber | ............... | G06F 17/2247 715/749 |
| 2014/0280515 A1* | 9/2014 | Wei | ......................... | H04L 67/02 709/203 |

FOREIGN PATENT DOCUMENTS

| | | |
|---|---|---|
| CN | 102625182 A | 8/2012 |
| CN | 103338384 A | 10/2013 |

OTHER PUBLICATIONS

Search Report in International Application No. PCT/CN2015/073167 dated Apr. 29, 2015, 2 pages.
International Preliminary Report on Patentability and Written Opinion in International Application No. PCT/CN2015/073167 dated Aug. 30, 2016, 5 pages.

* cited by examiner

METHOD AND TERMINAL FOR EXTRACTING WEBPAGE CONTENT, AND NON-TRANSITORY STORAGE MEDIUM

CROSS-REFERENCE TO RELATED APPLICATIONS

This application is a continuation of International Patent Application No. PCT/CN2015/073167 filed Feb. 16, 2015, which claims the priority benefit of Chinese Patent Application No. 201410067190.9 filed Feb. 26, 2014. The entire disclosures of each of the above applications are incorporated herein by reference.

FIELD OF THE TECHNOLOGY

The present disclosure relates to the field of Internet technologies, and in particular, to a method and a terminal for extracting webpage content, and a non-transitory storage medium.

BACKGROUND OF THE DISCLOSURE

At present, when a user visits a video website by using a browser, the browser sends a query instruction to a designated server, and the server searches a database according to a webpage URL in the query instruction, to obtain data such as links, titles and types of video resources included in the webpage URL, and returns the data to a browser terminal. The browser terminal displays the obtained data and presents the data to the user, so that the user can click to choose a corresponding option for playing.

In addition, a video player is embedded in some webpages in a form of a plug-in. Each video player plug-in has its own protocol specification. As long as a webpage developer writes a webpage script according to the specification, a corresponding player can be conveniently called to play video and audio data when a webpage is opened.

Although the existing manner for playing video website resources does not depend on extraction logic of a browser terminal and can reduce a burden on the terminal, a background server needs to be established and the server also needs to rely on support of a third-party database, which is a complex technology and increases development costs. In addition, each time a webpage is opened, a query instruction needs to be sent to the background server, and the server further needs to return a query result, which not only increases extra traffic consumption, but also affects a webpage display speed.

SUMMARY

Embodiments of the present invention provide a method and a terminal for extracting webpage content, and a non-transitory storage medium, which extract webpage resources rapidly and reduce costs.

The embodiments of the present invention provide a method for extracting webpage content performed at a terminal having one or more processors and a memory for storing programs to be executed by the processors, the method including:

responding to a webpage browsing instruction triggered on a browser by a mobile client to obtain a corresponding webpage;

parsing the webpage to obtain a document object model (DOM) node of a tag in a webpage script;

obtaining a plug-in tag node from the DOM node; and when a plug-in tag corresponding to the plug-in tag node is a predetermined type tag, extracting a plug-in resource that corresponds to the plug-in tag.

The embodiments of the present invention further provide a terminal for extracting webpage content, including:

one or more processors;

a memory; and a plurality of programs stored in the memory and to be executed by the one or more processors, the programs including:

a pulling module, configured to respond to a webpage browsing instruction triggered on a browser by a mobile client to obtain a corresponding webpage;

a parsing module, configured to parse the webpage to obtain a DOM node of a tag in a webpage script;

an obtaining module, configured to obtain a plug-in tag node from the DOM node; and an extracting module, configured to: when a plug-in tag corresponding to the plug-in tag node is a predetermined type tag, extract a plug-in resource that corresponds to the plug-in tag.

The embodiments of the present invention further provide a non-transitory storage medium, including computer program codes for executing a process of:

responding to a webpage browsing instruction triggered on a browser by a mobile client to obtain a corresponding webpage;

parsing the webpage to obtain a document object model (DOM) node of a tag in a webpage script;

obtaining a plug-in tag node from the DOM node; and when a plug-in tag corresponding to the plug-in tag node is a predetermined type tag, extracting a plug-in resource that corresponds to the plug-in tag.

In a method, an apparatus and a system for extracting webpage content that are provided by embodiments of the present invention, when a user browses a webpage, a browser obtains a DOM node of a tag in a webpage script by parsing the webpage; obtains a plug-in tag node from the DOM node; when a plug-in tag corresponding to the plug-in tag node is a predetermined type tag, extracts a plug-in resource that corresponds to the plug-in tag; and transmits the plug-in resource that corresponds to the plug-in tag to a corresponding player for playing, so that extracting of content that complies with a specific protocol specification can be completed when the webpage has not been truly rendered, thereby improving a speed of extracting predetermined webpage content and also improving a webpage display speed. In addition, because this solution can implement extracting of a plug-in resource on the side of a browser terminal without relying on a background server, this solution is technically easy for implementation and can reduce development costs.

In order to make the technical solution of the present disclosure more comprehensible, the present disclosure is described in the following in further detail with reference to the accompanying drawings.

DESCRIPTION OF EMBODIMENTS

It should be understood that, specific embodiments described herein are merely used to explain the present disclosure, but are not intended to limit the present disclosure.

The solution of the embodiments of the present invention is as follows: when a user browses a webpage, a browser obtains a DOM node of a tag in a webpage script by parsing the webpage; obtains a plug-in tag node from the DOM node; when a plug-in tag corresponding to the plug-in tag node is a predetermined type tag, extracts a plug-in resource that corresponds to the plug-in tag; and transmits the plug-in resource that corresponds to the plug-in tag to a corresponding player for playing, so that extracting of content that complies with a specific protocol specification can be completed when the webpage has not been truly rendered, so as to improve a speed of extracting predetermined webpage content and a webpage display speed. In addition, because this solution can implement extracting of a plug-in resource on the side of a browser terminal without relying on a background server, this solution is technically easy for implementation and can reduce development costs.

Figure 1:
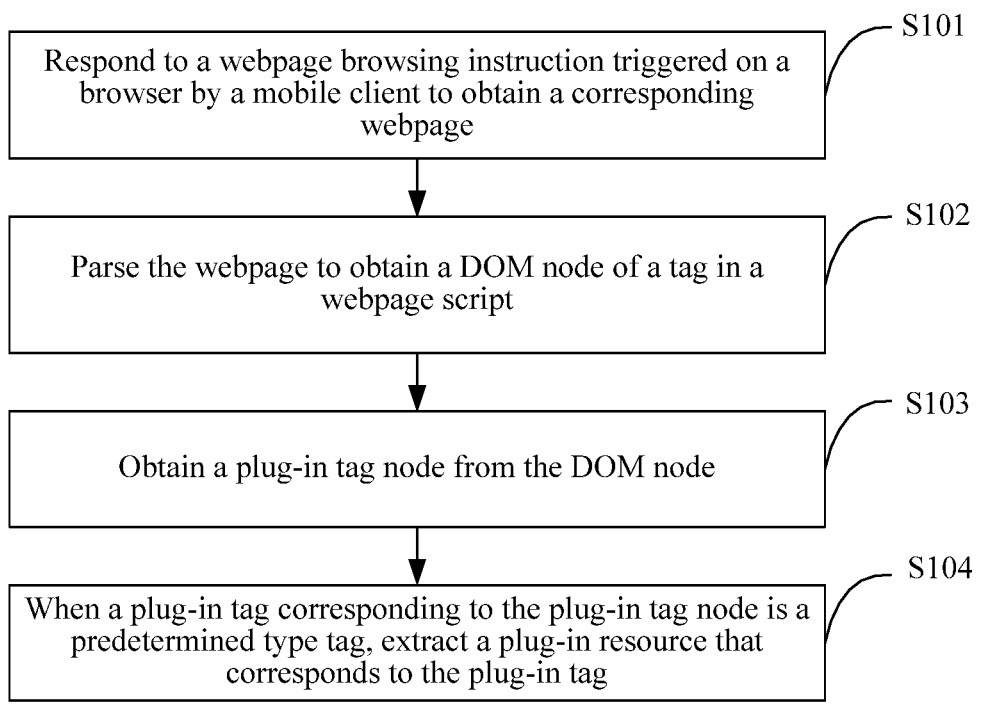
FIG. 1 is a schematic flowchart of a first embodiment of a method for extracting webpage content according to the present disclosure.

As shown in FIG. 1, a first embodiment of the present invention puts forward a method for extracting webpage content, including:

Step S101: Respond to a webpage browsing instruction triggered on a browser by a mobile client to obtain a corresponding webpage.

The browser in this embodiment may be a browser of a PC terminal, may also be a browser of a mobile terminal such as a mobile phone, and in particular refers to the browser of a mobile terminal such as a mobile phone. Because an existing browser player plug-in embedded in a webpage is mostly limited to a desktop system of a PC terminal, but not applicable to a browser of a mobile phone terminal; therefore when a webpage is opened at a mobile phone terminal, a video cannot be played on the page.

In addition, given that an existing webpage content extracting solution needs a background server that relies on support of a third-party database, not only are operating costs increased, but also each time a webpage is opened, a query instruction needs to be sent to the background server, and the server further needs to return a query result, which increases extra traffic consumption, and affects a webpage display speed. The solution of this embodiment does not rely on a background server, but implements, at a browser terminal, extracting of resource information that complies with a predetermined protocol specification in a webpage, so as to perform corresponding processing on the extracted resource information.

For example, a plug-in resource that corresponds to a browser player plug-in embedded in a webpage is extracted (for example, a Qvod resource from Kuaibo, a BDHD resource from Baidui Video, a flash resource, another plug-in resource of a predetermined type, or the like is extracted), and a corresponding player is called to implement playing of a video resource or the like, so that costs can be reduced.

Specifically, when a user browses a webpage by using a browser, the browser pulls a corresponding webpage according to a webpage browsing instruction triggered by the user. A video player that complies with the predetermined protocol specification is embedded in the webpage in a form of a plug-in. For video player plug-ins of different protocol specifications, a webpage developer writes corresponding webpage scripts according to the specifications. When the webpage is opened, a corresponding player can be conveniently called to play video and audio data.

Step S102: Parse the webpage to obtain a DOM node of a tag in a webpage script.

After pulling the webpage, the browser parses the webpage to generate a DOM tree. The DOM tree refers to a document model tree. A combination of all elemental units in an HTML webpage script may be regarded as a multi-branch tree, and this kind of tree structure is referred to as a node tree. Each node unit in the DOM tree corresponds to an elemental unit in the HTML webpage script, that is, a tag. All nodes may be visited by using this DOM tree, an operation such as traversal, insertion and deletion of a node may be performed on the DOM tree, and a new node element may also be created.

The DOM tree shows a set of the nodes and a relationship between the nodes. Starting from a root node, this tree branches out at a lowest level of the tree to a text node. There is a hierarchical relationship between all nodes in the DOM tree. This relationship is usually described by using father, child and sibling nodes. A father node has a child node, and child nodes at a same level are referred to as sibling nodes (brothers or sisters).

In the DOM tree, a node at the top is referred to as the root node. Each of the nodes except the root node has a father node. A node may have any number of child nodes, a leaf is a node that does not have a child node, and sibling nodes are nodes that have a same father node. Because document data such as HTML is constructed according to a form of a tree, in a case in which an exact structure of the tree is unclear and a data type included in the tree is also unclear, traversal may be performed on the tree.

In a tag of the HTML webpage script, a tag type <embed> (embed is a newly added tag in HTML5, and may embed any type of document in a page, a program that can display document content correctly must have been installed in a machine of the user, embed is usually used for inserting a multimedia format in a webpage, and the multimedia format may be .rm, .mid, .wav, or the like) is used for marking a kind of plug-in resource, and the plug-in resource presents content by using a type of plug-in (for example, a browser player plug-in) embedded in a browser.

The browser creates a DOM node for each tag in the webpage script during a DOM tree generating stage, which includes creating a plug-in tag (embed) node, and each plug-in tag node has a designated type or classification identifier (classid) used for identifying a type of the plug-in resource.

Step S103: Obtain a plug-in tag node from the DOM node.

Step S104: When a plug-in tag corresponding to the plug-in tag node is a predetermined type tag, extract a plug-in resource that corresponds to the plug-in tag.

In order to extract a plug-in resource of a predetermined type, this embodiment uses the following solution:

When creating a plug-in tag (embed) node, the browser obtains the plug-in tag node, and determines whether a plug-in tag corresponding to the plug-in tag node is a predetermined type tag according to a type or classid of the plug-in tag node, that is, whether complies with a predetermined protocol specification, and if yes, extracts a plug-in resource that corresponds to the plug-in tag. As an implementation manner, src/url/param_url of the plug-in tag may be extracted.

After the plug-in resource that corresponds to the plug-in tag is extracted, the plug-in resource may be transmitted to a corresponding player for playing.

In this embodiment, by using the foregoing solution, when a user browses a webpage by using a browser, the browser obtains a DOM node of a tag in a webpage script by parsing the webpage; obtains a plug-in tag node from the DOM node; when a plug-in tag corresponding to the plug-in tag node is a predetermined type tag, extracts a plug-in resource that corresponds to the plug-in tag; and transmits the plug-in resource that corresponds to the plug-in tag to a corresponding player for playing.

Compared with that the existing webpage content extracting solution needs a background server that relies on support of a third-party database, not only are operating costs increased, but also each time a webpage is opened, a query instruction needs to be sent to the background server, and the server further needs to return a query result, which increases extra traffic consumption, and affects a webpage display speed. The solution of this embodiment does not rely on a background server, but implements, at a browser terminal, extracting of resource information that complies with a predetermined protocol specification in a webpage, and can complete extracting of content that complies with the specific protocol specification when the webpage has not been truly rendered, thereby improving a speed of extracting predetermined webpage content and also improving a webpage display speed. In addition, because this solution can implement extracting of a plug-in resource on the side of a browser terminal without relying on a background server, this solution is technically easy for implementation and can reduce system development costs.

It should be noted that, given that during a development and design process, some webpages detect a type of a plug-in that is installed in a system currently run by the webpage, if a plug-in of a predetermined type does not exist, plug-in resource information of the predetermined type is not allowed to be extracted from the webpage. In view of this, in this embodiment, it may be declared in code of a browser that the browser supports a plug-in resource protocol that adapts to a predetermined rule, so that during a webpage opening process, resource information of the predetermined type can be extracted from the webpage.

Figure 2:
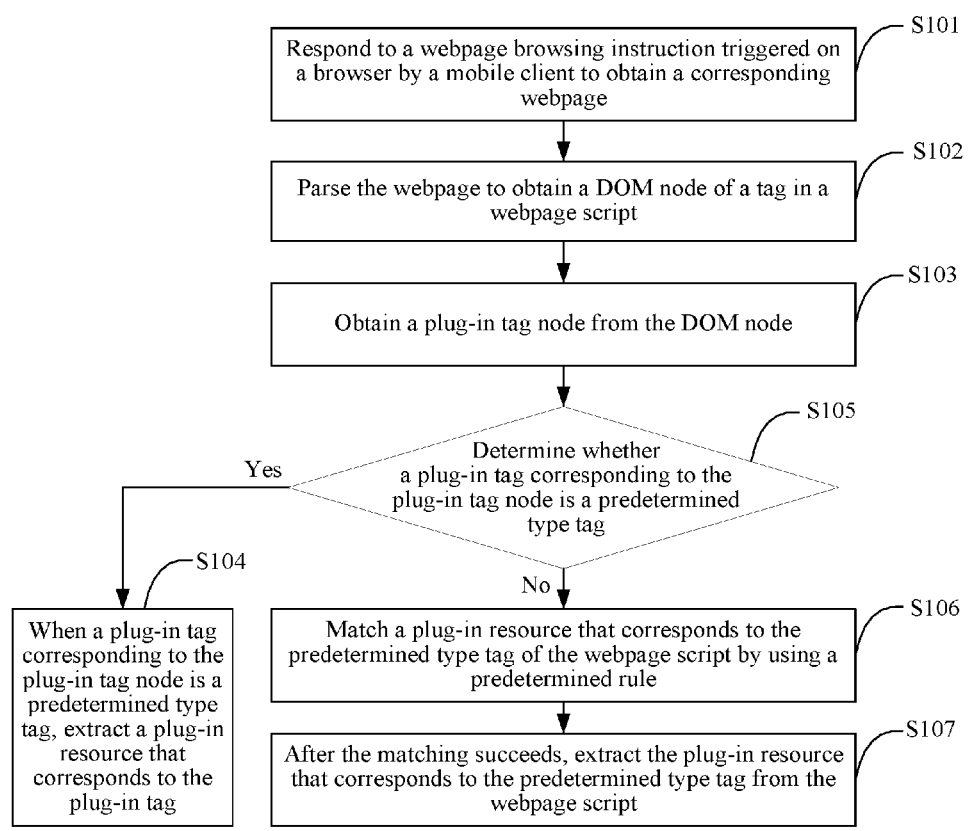
FIG. 2 is a schematic flowchart of a second embodiment of a method for extracting webpage content according to the present disclosure.

As shown in FIG. 2, a second embodiment of the present invention puts forward a method for extracting webpage content. On the basis of the first embodiment shown in FIG. 1, after the foregoing step S103: obtain a plug-in tag node from the DOM node, the method further includes:

Step S105: Determine whether a plug-in tag corresponding to the plug-in tag node is a predetermined type tag, and if yes, perform step S104; if not, perform step S106.

Step S106: Match a plug-in resource that corresponds to the predetermined type tag of the webpage script by using a predetermined rule.

Step S107: After the matching succeeds, extract the plug-in resource that corresponds to the predetermined type tag from the webpage script.

A difference between this embodiment and the first embodiment shown in FIG. 1 lies in that: this embodiment further includes a processing solution for extracting the plug-in resource when the plug-in tag corresponding to the plug-in tag node is not the predetermined type tag.

Specifically, in this embodiment, given that during a development and design process, some webpages set some other conditions, so as to ensure that the plug-in resource of the predetermined type can be played reliably, such as requiring a user to click an advertisement, or detecting a size and a system type of a browser client. In conclusion, this causes that the webpage possibly cannot obtain the plug-in tag of the predetermined type on a browser of a terminal such as a mobile phone, resulting in a failed operation of extracting the plug-in resource.

For this reason, this embodiment uses the following solution: searching for resource information of the plug-in tag of the predetermined type from webpage script resources by using a regular matching method.

Specific implementation is as follows:

When it is determined that the plug-in tag corresponding to the obtained plug-in tag node is not the predetermined type tag, the predetermined rule such as a regular expression rule is used to match the plug-in resource that corresponds to the predetermined type tag of the webpage script; and after the matching succeeds, the plug-in resource that corresponds to the predetermined type tag is extracted from the webpage script. If the matching fails, it indicates that extracting the plug-in resource fails.

In this embodiment, by using the foregoing solution, in an application scenario in which a plug-in tag of a predetermined type possibly cannot be obtained in webpage design, resource information of the plug-in tag of the predetermined type is searched for from webpage script resources by using a regular matching method, thereby improving a success rate of extracting webpage resource information, and ensuring reliability of an operation of extracting webpage resource information.

It should be noted that, the foregoing predetermined rule may be dynamically configured, may be configured at a browser terminal, and may also be delivered to a browser terminal after being configured by a background server, that is, a plug-in resource extracting rule in this embodiment may not be hard-coded in code of a browser, but may be specified dynamically by using script code and may also be dynamically corrected according to a revision situation of each website.

After a version of a video website where a webpage is located is updated, an original webpage resource extracting rule becomes invalid because dynamic adjustment is not available. If an existing webpage resource extracting solution is used, the webpage resource extracting rule cannot be adjusted; however, in this embodiment, because a regular matching rule is used, and the predetermined rule may be dynamically configured, that is, may be modified at any time, when an original webpage resource extracting rule becomes invalid because of an update of the version of the video website, a new regular matching rule may be delivered by using a browser terminal or a background server in this embodiment, so as to deal with the problem that an original template becomes invalid due to website revision, thereby improving flexibility of the webpage resource extracting rule, and ensuring that an operation of extracting webpage resources runs normally.

Figure 3:
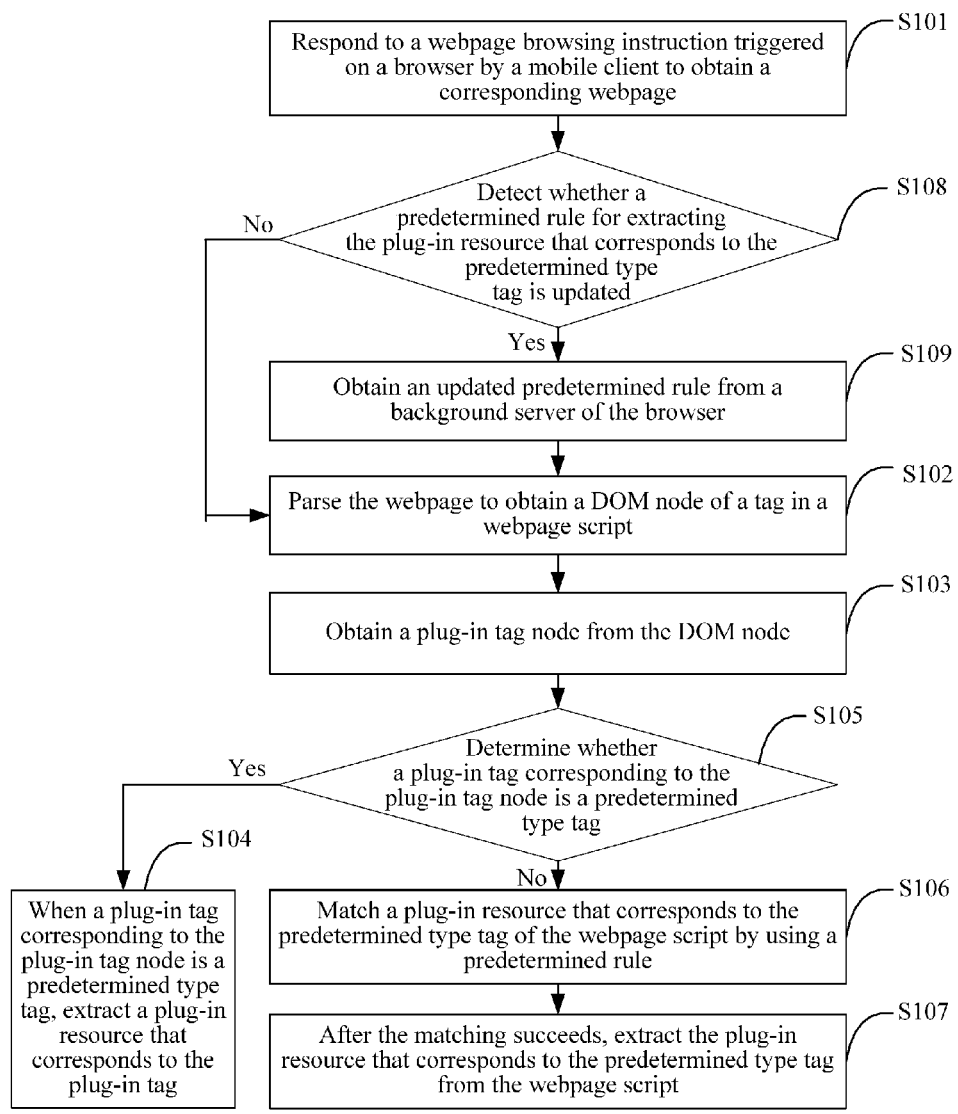
FIG. 3 is a schematic flowchart of a third embodiment of a method for extracting webpage content according to the present disclosure.

As shown in FIG. 3, a third embodiment of the present invention puts forward a method for extracting webpage content. On the basis of the second embodiment shown in FIG. 2, after the foregoing step S101: respond to a webpage browsing instruction triggered on a browser by a mobile client to pull a corresponding webpage, the method further includes:

Step S108: Detect whether a predetermined rule for extracting the plug-in resource that corresponds to the predetermined type tag is updated, and if yes, perform step S109; and if not, perform step S102.

Step S109: Obtain an updated predetermined rule from a background server of the browser; and perform step S102.

A difference between this embodiment and the second embodiment shown in FIG. 2 lies in that: this embodiment further includes a plug-in resource extracting solution that deals with an updated predetermined rule.

Specifically, after the browser pulls the webpage, for the webpage, it is detected whether the predetermined rule of extracting the plug-in resource that corresponds to the predetermined type tag is updated, and if yes, an updated predetermined rule is obtained. As an implementation manner, the predetermined rule may be configured and updated at a browser terminal, and may also be delivered to a browser terminal after being configured and updated by a background server.

In this embodiment, an example that the predetermined rule is configured and updated by a background server is given. When it is detected that the predetermined rule of extracting the plug-in resource that corresponds to the predetermined type tag is updated, an updated predetermined rule is obtained from a background server of the browser.

Then, the browser parses the webpage to generate a DOM tree, and creates a DOM node for each tag in the webpage script during a DOM tree generating stage. When creating a plug-in tag (embed) node, the browser obtains the plug-in tag node, and determines whether a plug-in tag corresponding to the plug-in tag node is a predetermined type tag according to a type or classid of the plug-in tag node, that is, whether complies with a predetermined protocol specification, and if yes, extracts a plug-in resource that corresponds to the plug-in tag, and transmits the plug-in resource that corresponds to the plug-in tag to a corresponding player for playing.

If it is determined that the plug-in tag corresponding to the plug-in tag node is not the predetermined type tag, the updated predetermined rule such as a regular expression rule is used to match the plug-in resource that corresponds to the predetermined type tag of the webpage script; and after the matching succeeds, the plug-in resource that corresponds to the predetermined type tag is extracted from the webpage script, and the corresponding plug-in resource is transmitted to a corresponding player for playing. If the matching fails, it indicates that extracting the plug-in resource fails.

In this embodiment, by using the foregoing solution, when a user browses a webpage, a browser obtains a DOM node of a tag in a webpage script by parsing the webpage; obtains a plug-in tag node from the DOM node; when a plug-in tag corresponding to the plug-in tag node is a predetermined type tag, extracts a plug-in resource that corresponds to the plug-in tag; and transmits the plug-in resource that corresponds to the plug-in tag to a corresponding player for playing, so that extracting of content that complies with a specific protocol specification can be completed when the webpage has not been truly rendered, thereby improving a speed of extracting predetermined webpage content and also improving a webpage display speed. In addition, because this solution can implement extracting of a plug-in resource on the side of a browser terminal without relying on a background server, this solution is technically easy for implementation and can reduce development costs. In addition, in an application scenario in which a plug-in tag of a predetermined type possibly cannot be obtained in webpage design, resource information of the plug-in tag of the predetermined type is searched for from webpage script resources by using a regular matching method, thereby improving a success rate of extracting webpage resource information, and ensuring reliability of an operation of extracting webpage resource information. Moreover, a predetermined rule may be dynamically configured, that is, may be modified at any time, and when an original webpage resource extracting rule becomes invalid because of an update of a version of a video website, a new regular matching rule may be delivered by using a browser terminal or a background server, so as to deal with the problem that an original template becomes invalid due to website revision, thereby improving flexibility of the webpage resource extracting rule.

Figure 4:
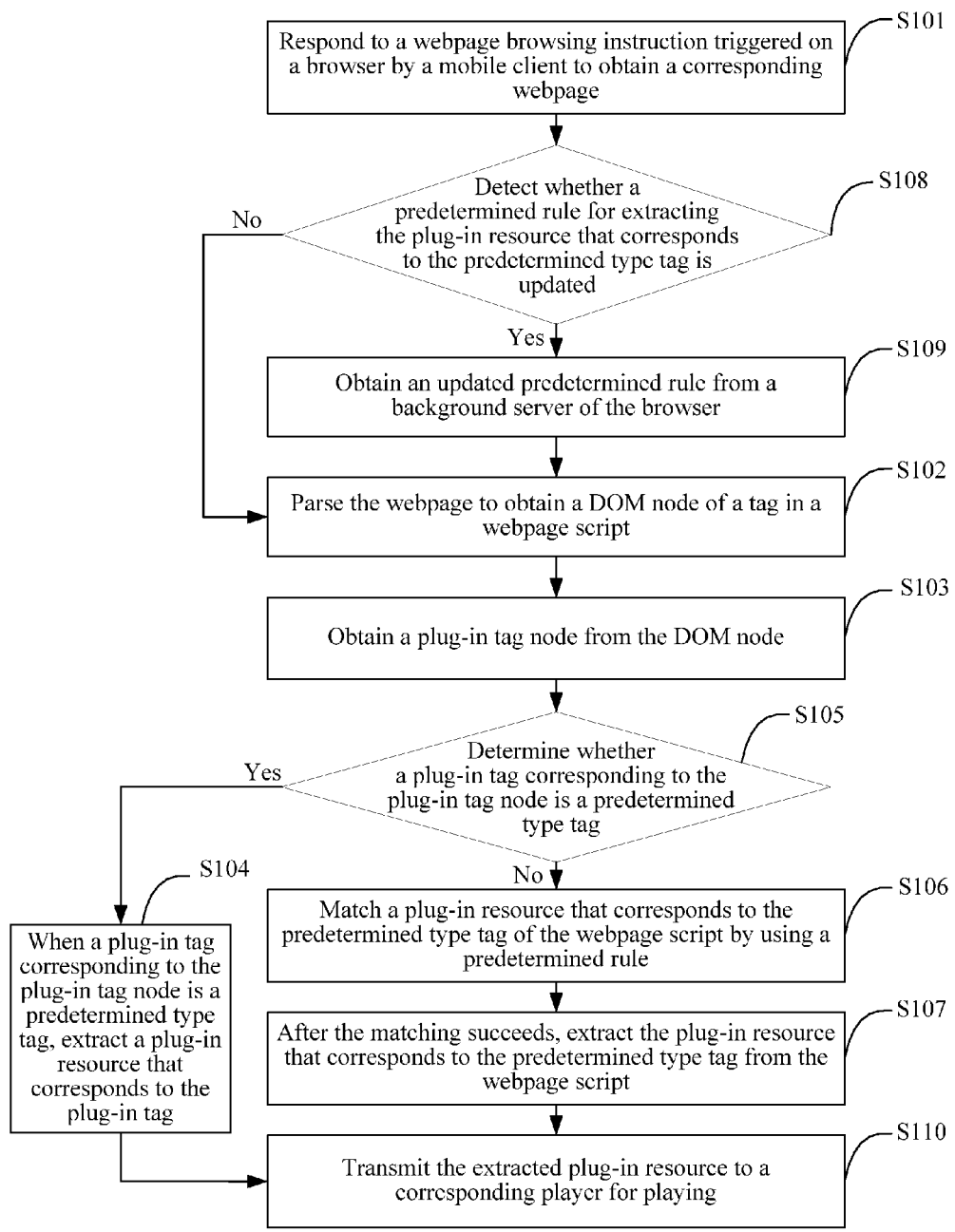
FIG. 4 is a schematic flowchart of a fourth embodiment of a method for extracting webpage content according to the present disclosure.

As shown in FIG. 4, a fourth embodiment of the present invention puts forward a method for extracting webpage content. On the basis of the third embodiment shown in FIG. 3, the method may further include:

Step S110: Transmit the extracted plug-in resource to a corresponding player for playing.

A difference between this embodiment and the third embodiment shown in FIG. 3 lies in that: this embodiment further includes a solution for playing the extracted plug-in resource.

After the corresponding plug-in resource is extracted, the plug-in resource is transmitted to a corresponding player for playing, so that it is implemented that webpage content of a plug-in type is played and displayed on a browser of a terminal, in particular a mobile terminal such as a mobile phone. The rest is the same as the third embodiment.

Figure 5:
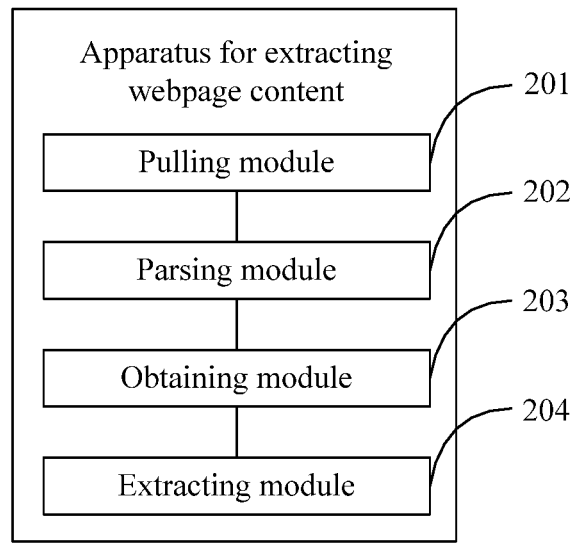
FIG. 5 is a schematic diagram of functional modules of a first embodiment of an apparatus for extracting webpage content according to the present disclosure.

As shown in FIG. 5, a first embodiment of the present invention puts forward an apparatus for extracting webpage content, including: a pulling module 201, a parsing module 202, an obtaining module 203, and an extracting module 204.

The pulling module 201 is configured to respond to a webpage browsing instruction triggered on a browser by a mobile client to obtain a corresponding webpage.

The parsing module 202 is configured to parse the webpage to obtain a DOM node of a tag in a webpage script.

The obtaining module 203 is configured to obtain a plug-in tag node from the DOM node.

The extracting module 204 is configured to: when a plug-in tag corresponding to the plug-in tag node is a predetermined type tag, extract a plug-in resource that corresponds to the plug-in tag.

The apparatus in this embodiment may be disposed on a browser terminal. The browser in this embodiment may be a browser of a PC terminal, may also be a browser of a mobile terminal such as a mobile phone, and in particular refers to the browser of a mobile terminal such as a mobile phone. Because an existing browser player plug-in embedded in a webpage is mostly limited to a desktop system of a PC terminal, but not applicable to a browser of a mobile phone terminal; therefore when a webpage is opened at a mobile phone terminal, a video cannot be played on the page.

In addition, given that an existing webpage content extracting solution needs a background server that relies on support of a third-party database, not only are operating costs increased, but also each time a webpage is opened, a query instruction needs to be sent to the background server, and the server further needs to return a query result, which increases extra traffic consumption, and affects a webpage display speed. The solution of this embodiment does not rely on a background server, but implements, at a browser terminal, extracting of resource information that complies with a predetermined protocol specification in a webpage, so as to perform corresponding processing on the extracted resource information.

For example, a plug-in resource that corresponds to a browser player plug-in embedded in a webpage is extracted (for example, a Qvod resource from Kuaibo, a BDHD resource from Baidu Video, a flash resource, another plug-in resource of a predetermined type, or the like is extracted), and a corresponding player is called to implement playing of a video resource or the like, so that costs can be reduced.

Specifically, when a user browses a webpage by using a browser, the browser pulls a corresponding webpage according to a webpage browsing instruction triggered by the user. A video player that complies with the predetermined protocol specification is embedded in the webpage in a form of a plug-in. For video player plug-ins of different protocol specifications, a webpage developer writes corresponding webpage scripts according to the specifications. When the webpage is opened, a corresponding player can be conveniently called to play video and audio data.

After pulling the webpage, the browser parses the webpage to generate a DOM tree. The DOM tree refers to a document model tree. A combination of all elemental units in an HTML webpage script may be regarded as a multi-branch tree, and this kind of tree structure is referred to as a node tree. Each node unit in the DOM tree corresponds to an elemental unit in the HTML webpage script, that is, a tag. All nodes may be visited by using this DOM tree, an operation such as traversal, insertion and deletion of a node may be performed on the DOM tree, and a new node element may also be created.

The DOM tree shows a set of the nodes and a relationship between the nodes. Starting from a root node, this tree branches out at a lowest level of the tree to a text node. There is a hierarchical relationship between all nodes in the DOM tree. This relationship is usually described by using father, child and sibling nodes. A father node has a child node, and child nodes at a same level are referred to as sibling nodes (brothers or sisters).

In the DOM tree, a node at the top is referred to as the root node. Each of the nodes except the root node has a father node. A node may have any number of child nodes, a leaf is a node that does not have a child node, and sibling nodes are nodes that have a same father node. Because document data such as HTML is constructed according to a form of a tree, in a case in which an exact structure of the tree is unclear and a data type included in the tree is also unclear, traversal may be performed on the tree.

In a tag of the HTML webpage script, a tag type <embed> (embed is a newly added tag in HTML5, and may embed any type of document in a page, a program that can display document content correctly must have been installed in a machine of the user, embed is usually used for inserting a multimedia format in a webpage, and the multimedia format may be .rm, .mid, .wav, or the like) is used for marking a kind of plug-in resource, and the plug-in resource presents content by using a type of plug-in (for example, a browser player plug-in) embedded in a browser.

The browser creates a DOM node for each tag in the webpage script during a DOM tree generating stage, which includes creating a plug-in tag (embed) node, and each plug-in tag node has a designated type or classification identifier (classid) used for identifying a type of the plug-in resource.

In order to extract a plug-in resource of a predetermined type, this embodiment uses the following solution:

When creating a plug-in tag (embed) node, the browser obtains the plug-in tag node, and determines whether a plug-in tag corresponding to the plug-in tag node is a predetermined type tag according to a type or classid of the plug-in tag node, that is, whether complies with a predetermined protocol specification, and if yes, extracts a plug-in resource that corresponds to the plug-in tag. As an implementation manner, src/url/param_url of the plug-in tag may be extracted.

After the plug-in resource that corresponds to the plug-in tag is extracted, the plug-in resource may be transmitted to a corresponding player for playing.

In this embodiment, by using the foregoing solution, when a user browses a webpage by using a browser, the browser obtains a DOM node of a tag in a webpage script by parsing the webpage; obtains a plug-in tag node from the DOM node; when a plug-in tag corresponding to the plug-in tag node is a predetermined type tag, extracts a plug-in resource that corresponds to the plug-in tag; and transmits the plug-in resource that corresponds to the plug-in tag to a corresponding player for playing.

Compared with that the existing webpage content extracting solution needs a background server that relies on support of a third-party database, not only are operating costs increased, but also each time a webpage is opened, a query instruction needs to be sent to the background server, and the server further needs to return a query result, which increases extra traffic consumption, and affects a webpage display speed. The solution of this embodiment does not rely on a background server, but implements, at a browser terminal, extracting of resource information that complies with a predetermined protocol specification in a webpage, and can complete extracting of content that complies with the specific protocol specification when the webpage has not been truly rendered, thereby improving a speed of extracting predetermined webpage content and also improving a webpage display speed. In addition, because this solution can implement extracting of a plug-in resource on the side of a browser terminal without relying on a background server, this solution is technically easy for implementation and can reduce system development costs.

It should be noted that, given that during a development and design process, some webpages detect a type of a plug-in that is installed in a system currently run by the webpage, if a plug-in of a predetermined type does not exist, plug-in resource information of the predetermined type is not allowed to be extracted from the webpage. In view of this, in this embodiment, it may be declared in code of a browser that the browser supports a plug-in resource protocol that adapts to a predetermined rule, so that during a webpage opening process, resource information of the predetermined type can be extracted from the webpage.

Figure 6:
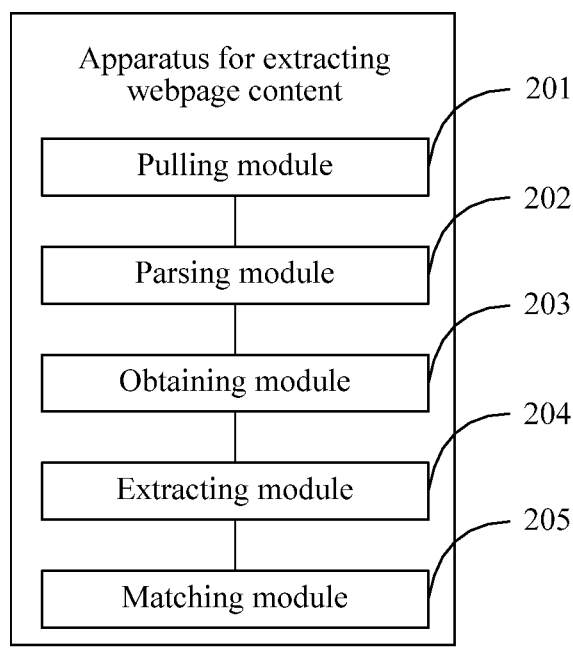
FIG. 6 is a schematic diagram of functional modules of a second embodiment of an apparatus for extracting webpage content according to the present disclosure.

As shown in FIG. 6, a second embodiment of the present invention puts forward an apparatus for extracting webpage content. On the basis of the first embodiment shown in FIG. 5, the apparatus further includes:

a matching module 205, configured to: when the plug-in tag corresponding to the plug-in tag node is not the predetermined type tag, match a plug-in resource that corresponds to the predetermined type tag of the webpage script by using a predetermined rule such as a regular expression rule, where the extracting module 204 is further configured to: after the matching succeeds, extract the plug-in resource that corresponds to the predetermined type tag from the webpage script.

A difference between this embodiment and the first embodiment shown in FIG. 5 lies in that: this embodiment further includes a processing solution for extracting the plug-in resource when the plug-in tag corresponding to the plug-in tag node is not the predetermined type tag.

Specifically, in this embodiment, given that during a development and design process, some webpages set some other conditions, so as to ensure that the plug-in resource of the predetermined type can be played reliably, such as requiring a user to click an advertisement, or detecting a size and a system type of a browser client. In conclusion, this causes that the webpage possibly cannot obtain the plug-in tag of the predetermined type on a browser of a terminal such as a mobile phone, resulting in a failed operation of extracting the plug-in resource.

For this reason, this embodiment uses the following solution: searching for resource information of the plug-in tag of the predetermined type from webpage script resources by using a regular matching method.

Specific implementation is as follows:

When it is determined that the plug-in tag corresponding to the obtained plug-in tag node is not the predetermined type tag, the predetermined rule such as a regular expression rule is used to match the plug-in resource that corresponds to the predetermined type tag of the webpage script; and after the matching succeeds, the plug-in resource that corresponds to the predetermined type tag is extracted from the webpage script. If the matching fails, it indicates that extracting the plug-in resource fails.

In this embodiment, by using the foregoing solution, in an application scenario in which a plug-in tag of a predetermined type possibly cannot be obtained in webpage design, resource information of the plug-in tag of the predetermined type is searched for from webpage script resources by using a regular matching method, thereby improving a success rate of extracting webpage resource information, and ensuring reliability of an operation of extracting webpage resource information.

It should be noted that, the foregoing predetermined rule may be dynamically configured, may be configured at a browser terminal, and may also be delivered to a browser terminal after being configured by a background server, that is, a plug-in resource extracting rule in this embodiment may not be hard-coded in code of a browser, but may be specified dynamically by using script code and may also be dynamically corrected according to a revision situation of each website.

After a version of a video website where a webpage is located is updated, an original webpage resource extracting rule becomes invalid because dynamic adjustment is not available. If an existing webpage resource extracting solution is used, the webpage resource extracting rule cannot be adjusted; however, in this embodiment, because a regular matching rule is used, and the predetermined rule may be dynamically configured, that is, may be modified at any time, when an original webpage resource extracting rule becomes invalid because of an update of the version of the video website, a new regular matching rule may be delivered by using a browser terminal or a background server in this embodiment, so as to deal with the problem that an original template becomes invalid due to website revision, thereby improving flexibility of the webpage resource extracting rule, and ensuring that an operation of extracting webpage resources runs normally.

Figure 7:
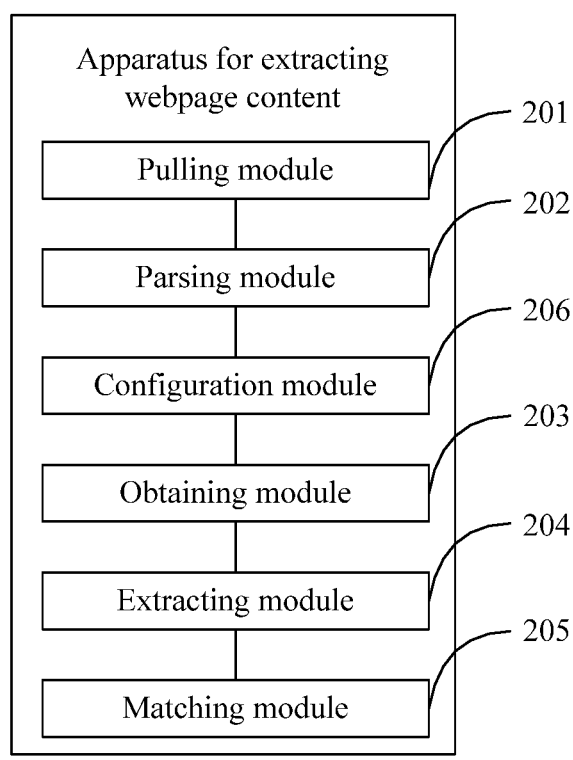
FIG. 7 is a schematic diagram of functional modules of a third embodiment of an apparatus for extracting webpage content according to the present disclosure.

As shown in FIG. 7, a third embodiment of the present invention puts forward an apparatus for extracting webpage content. On the basis of the second embodiment shown in FIG. 6, the apparatus further includes:

a configuration module 206, configured to: detect whether a predetermined rule for extracting the plug-in resource that corresponds to the predetermined type tag is updated, and if yes, obtain an updated predetermined rule from a background server of the browser; and if not, the parsing module 202 parses the webpage to obtain a DOM node of a tag in a webpage script.

A difference between this embodiment and the second embodiment shown in FIG. 6 lies in that: this embodiment further includes a plug-in resource extracting solution that deals with an updated predetermined rule.

Specifically, after the browser pulls the webpage, for the webpage, it is detected whether the predetermined rule of extracting the plug-in resource that corresponds to the predetermined type tag is updated, and if yes, an updated predetermined rule is obtained. As an implementation manner, the predetermined rule may be configured and updated at a browser terminal, and may also be delivered to a browser terminal after being configured and updated by a background server.

In this embodiment, an example that the predetermined rule is configured and updated by a background server is given. When it is detected that the predetermined rule of extracting the plug-in resource that corresponds to the predetermined type tag is updated, an updated predetermined rule is obtained from a background server of the browser.

Then, the browser parses the webpage to generate a DOM tree, and creates a DOM node for each tag in the webpage script during a DOM tree generating stage. When creating a plug-in tag (embed) node used for marking a plug-in resource, the browser obtains the plug-in tag node, and determines whether a plug-in tag corresponding to the plug-in tag node is a predetermined type tag according to a type or classid of the plug-in tag node, that is, whether complies with a predetermined protocol specification, and if yes, extracts a plug-in resource that corresponds to the plug-in tag, and transmits the plug-in resource that corresponds to the plug-in tag to a corresponding player for playing.

If it is determined that the plug-in tag corresponding to the plug-in tag node is not the predetermined type tag, the updated predetermined rule is used to match the plug-in resource that corresponds to the predetermined type tag of the webpage script; and after the matching succeeds, the plug-in resource that corresponds to the predetermined type tag is extracted from the webpage script, and the corresponding plug-in resource is transmitted to a corresponding player for playing. If the matching fails, it indicates that extracting the plug-in resource fails.

In this embodiment, by using the foregoing solution, when a user browses a webpage, a browser obtains a DOM node of a tag in a webpage script by parsing the webpage; obtains a plug-in tag node from the DOM node; when a plug-in tag corresponding to the plug-in tag node is a predetermined type tag, extracts a plug-in resource that corresponds to the plug-in tag; and transmits the plug-in resource that corresponds to the plug-in tag to a corresponding player for playing, so that extracting of content that complies with a specific protocol specification can be completed when the webpage has not been truly rendered, thereby improving a speed of extracting predetermined webpage content and also improving a webpage display speed. In addition, because this solution can implement extracting of a plug-in resource on the side of a browser terminal without relying on a background server, this solution is technically easy for implementation and can reduce development costs. In addition, in an application scenario in which a plug-in tag of a predetermined type possibly cannot be obtained in webpage design, resource information of the plug-in tag of the predetermined type is searched for from webpage script resources by using a regular matching method, thereby improving a success rate of extracting webpage resource information, and ensuring reliability of an operation of extracting webpage resource information. Moreover, a predetermined rule may be dynamically configured, that is, may be modified at any time, and when an original webpage resource extracting rule becomes invalid because of an update of a version of a video website, a new regular matching rule may be delivered by using a browser terminal or a background server, so as to deal with the problem that an original template becomes invalid due to website revision, thereby improving flexibility of the webpage resource extracting rule.

Figure 8:
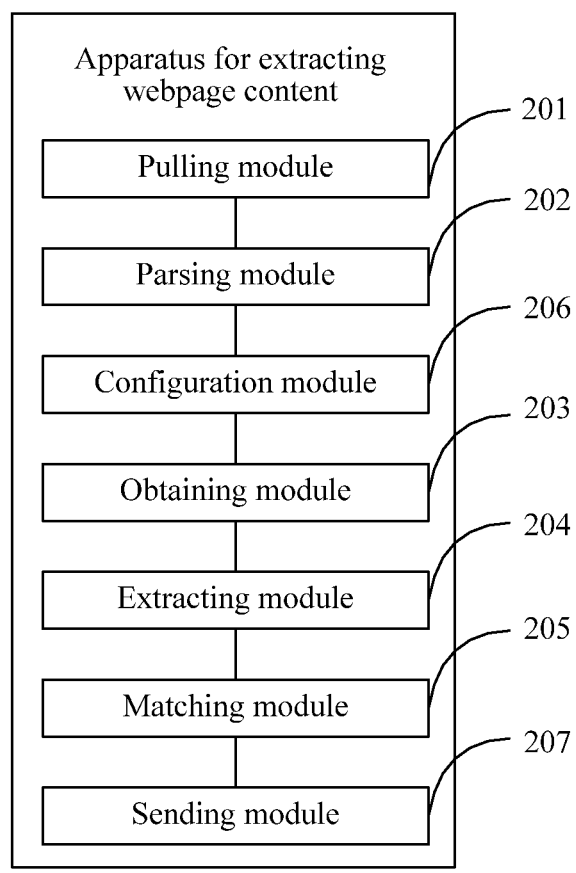
FIG. 8 is a schematic diagram of functional modules of a fourth embodiment of an apparatus for extracting webpage content according to the present disclosure.

As shown in FIG. 8, a fourth embodiment of the present invention puts forward an apparatus for extracting webpage content. On the basis of the third embodiment shown in FIG. 7, the apparatus further includes:

a sending module 207, configured to transmit the extracted plug-in resource to a corresponding player for playing.

A difference between this embodiment and the third embodiment shown in FIG. 7 lies in that: this embodiment further includes a solution for playing the extracted plug-in resource.

After the corresponding plug-in resource is extracted, the plug-in resource is transmitted to a corresponding player for playing, so that it is implemented that webpage content of a plug-in type is played and displayed on a browser of a terminal, in particular a mobile terminal such as a mobile phone. The rest is the same as the third embodiment.

Figure 9:
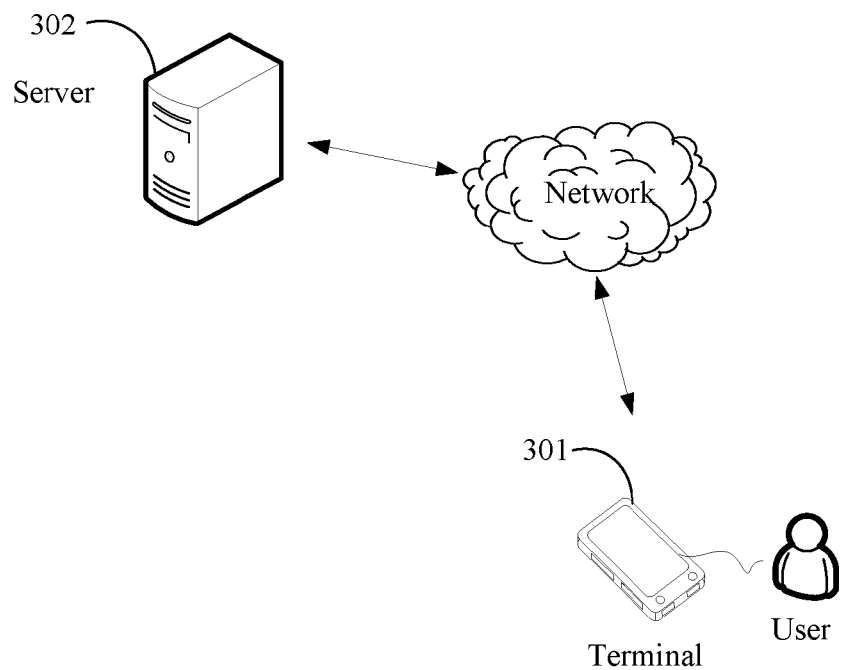
FIG. 9 is a schematic architectural diagram of a preferred embodiment of a system for extracting webpage content according to the present disclosure.

As shown in FIG. 9, a preferred embodiment of the present invention puts forward a system for extracting webpage content, including: a terminal 301 and a server 302 that is connected in communication to the terminal 301, and the terminal 301 includes the apparatus described above.

The server 302 is configured to deliver, to the terminal 301, a predetermined rule for extracting a plug-in resource that corresponds to a predetermined type tag.

Specifically, a browser in this embodiment may be a browser of a PC terminal, may also be a browser of the mobile terminal 301 such as a mobile phone, and in particular refers to the browser of the mobile terminal 301 such as a mobile phone. Because an existing browser player plug-in embedded in a webpage is mostly limited to a desktop system of a PC terminal, but not applicable to a browser of a mobile phone terminal; therefore when a webpage is opened at a mobile phone terminal, a video cannot be played on the page.

In addition, given that an existing webpage content extracting solution needs the background server 302 that relies on support of a third-party database, not only are operating costs increased, but also each time a webpage is opened, a query instruction needs to be sent to the background server 302, and the server 302 further needs to return a query result, which increases extra traffic consumption, and affects a webpage display speed. The solution of this embodiment does not rely on the background server 302, but implements, at the browser terminal 301, extracting of resource information that complies with a predetermined protocol specification in a webpage, so as to perform corresponding processing on the extracted resource information.

For example, a plug-in resource that corresponds to a browser player plug-in embedded in a webpage is extracted (for example, a Qvod resource from Kuaibo, a BDHD resource from Baidu Video, a flash resource, another plug-in resource of a predetermined type, or the like is extracted), and a corresponding player is called to implement playing of a video resource or the like, so that costs can be reduced.

Specifically, when a user browses a webpage by using a browser, the browser pulls a corresponding webpage according to a webpage browsing instruction triggered by the user. A video player that complies with the predetermined protocol specification is embedded in the webpage in a form of a plug-in. For video player plug-ins of different protocol specifications, a webpage developer writes corresponding webpage scripts according to the specifications. When the webpage is opened, a corresponding player can be conveniently called to play video and audio data.

After pulling the webpage, the browser parses the webpage to generate a DOM tree. The DOM tree refers to a document model tree. A combination of all elemental units in an HTML webpage script may be regarded as a multi-branch tree, and this kind of tree structure is referred to as a node tree. Each node unit in the DOM tree corresponds to an elemental unit in the HTML webpage script, that is, a tag. All nodes may be visited by using this DOM tree, an operation such as traversal, insertion and deletion of a node may be performed on the DOM tree, and a new node element may also be created.

The DOM tree shows a set of the nodes and a relationship between the nodes. Starting from a root node, this tree branches out at a lowest level of the tree to a text node. There is a hierarchical relationship between all nodes in the DOM tree. This relationship is usually described by using father, child and sibling nodes. A father node has a child node, and child nodes at a same level are referred to as sibling nodes (brothers or sisters).

In the DOM tree, a node at the top is referred to as the root node. Each of the nodes except the root node has a father node. A node may have any number of child nodes, a leaf is a node that does not have a child node, and sibling nodes are nodes that have a same father node. Because document data such as HTML is constructed according to a form of a tree, in a case in which an exact structure of the tree is unclear and a data type included in the tree is also unclear, traversal may be performed on the tree.

In a tag of the HTML webpage script, a tag type <embed> (embed is a newly added tag in HTML5, and may embed any type of document in a page, a program that can display document content correctly must have been installed in a machine of the user, embed is usually used for inserting a multimedia format in a webpage, and the multimedia format may be .rm, .mid, .wav, or the like) is used for marking a kind of plug-in resource, and the plug-in resource presents content by using a type of plug-in (for example, a browser player plug-in) embedded in a browser.

The browser creates a DOM node for each tag in the webpage script during a DOM tree generating stage, which includes creating a plug-in tag (embed) node, and each plug-in tag node has a designated type or classification identifier (classid) used for identifying a type of the plug-in resource.

In order to extract a plug-in resource of a predetermined type, this embodiment uses the following solution:

When creating a plug-in tag (embed) node, the browser obtains the plug-in tag node, and determines whether a plug-in tag corresponding to the plug-in tag node is a predetermined type tag according to a type or classid of the plug-in tag node, that is, whether complies with a predetermined protocol specification, and if yes, extracts a plug-in resource that corresponds to the plug-in tag. As an implementation manner, src/url/param_url of the plug-in tag may be extracted.

After the plug-in resource that corresponds to the plug-in tag is extracted, the plug-in resource may be transmitted to a corresponding player for playing.

In this embodiment, by using the foregoing solution, when a user browses a webpage by using a browser, the browser obtains a DOM node of a tag in a webpage script by parsing the webpage; obtains a plug-in tag node from the DOM node; when a plug-in tag corresponding to the plug-in tag node is a predetermined type tag, extracts a plug-in resource that corresponds to the plug-in tag; and transmits the plug-in resource that corresponds to the plug-in tag to a corresponding player for playing.

Compared with that the existing webpage content extracting solution needs the background server 302 that relies on support of a third-party database, not only are operating costs increased, but also each time a webpage is opened, a query instruction needs to be sent to the background server 302, and the server 302 further needs to return a query result, which increases extra traffic consumption, and affects a webpage display speed. The solution of this embodiment does not rely on the background server 302, but implements, at the browser terminal 301, extracting of resource information that complies with a predetermined protocol specification in a webpage, and can complete extracting of content that complies with the specific protocol specification when the webpage has not been truly rendered, thereby improving a speed of extracting predetermined webpage content and also improving a webpage display speed. In addition, because this solution can implement extracting of a plug-in resource on the side of the browser terminal 301 without relying on the background server 302, this solution is technically easy for implementation and can reduce system development costs.

It should be noted that, given that during a development and design process, some webpages detect a type of a plug-in that is installed in a system currently run by the webpage, if a plug-in of a predetermined type does not exist, plug-in resource information of the predetermined type is not allowed to be extracted from the webpage. In view of this, in this embodiment, it may be declared in code of a browser that the browser supports a plug-in resource protocol that adapts to a predetermined rule, so that during a webpage opening process, resource information of the predetermined type can be extracted from the webpage.

Further, this embodiment further includes a processing solution for extracting the plug-in resource when the plug-in tag corresponding to the plug-in tag node is not the predetermined type tag.

Specifically, in this embodiment, given that during a development and design process, some webpages set some other conditions, so as to ensure that the plug-in resource of the predetermined type can be played reliably, such as requiring a user to click an advertisement, or detecting a size and a system type of a browser client. In conclusion, this causes that the webpage possibly cannot obtain the plug-in tag of the predetermined type on a browser of the terminal 301 such as a mobile phone, resulting in a failed operation of extracting the plug-in resource.

For this reason, this embodiment uses the following solution: searching for resource information of the plug-in tag of the predetermined type from webpage script resources by using a regular matching method.

Specific implementation is as follows:

When it is determined that the plug-in tag corresponding to the obtained plug-in tag node is not the predetermined type tag, the predetermined rule such as a regular expression rule is used to match the plug-in resource that corresponds to the predetermined type tag of the webpage script; and after the matching succeeds, the plug-in resource that corresponds to the predetermined type tag is extracted from the webpage script. If the matching fails, it indicates that extracting the plug-in resource fails.

In this embodiment, by using the foregoing solution, in an application scenario in which a plug-in tag of a predetermined type possibly cannot be obtained in webpage design, resource information of the plug-in tag of the predetermined type is searched for from webpage script resources by using a regular matching method, thereby improving a success rate of extracting webpage resource information, and ensuring reliability of an operation of extracting webpage resource information.

It should be noted that, the foregoing predetermined rule may be dynamically configured, may be configured at the browser terminal 301, and may also be delivered to the browser terminal 301 after being configured by the background server 302. In this embodiment, an example that the predetermined rule is delivered to the browser terminal 301 after being configured by the background server 302 is given, that is, a plug-in resource extracting rule in this embodiment may not be hard-coded in code of a browser, but may be specified dynamically by using script code and may also be dynamically corrected according to a revision situation of each website.

After a version of a video website where a webpage is located is updated, an original webpage resource extracting rule becomes invalid because dynamic adjustment is not available. If an existing webpage resource extracting solution is used, the webpage resource extracting rule cannot be adjusted; however, in this embodiment, because a regular matching rule is used, and a predetermined rule may be dynamically configured, that is, may be modified at any time, when an original webpage resource extracting rule becomes invalid because of an update of the version of the video website, a new regular matching rule may be delivered by using the browser terminal 301 or the background server 302 in this embodiment, so as to deal with the problem that an original template becomes invalid due to website revision, thereby improving flexibility of the webpage resource extracting rule, and ensuring that an operation of extracting webpage resources runs normally.

Further, this embodiment further includes a plug-in resource extracting solution that deals with an updated predetermined rule.

Specifically, after the browser pulls the webpage, for the webpage, it is detected whether the predetermined rule of extracting the plug-in resource that corresponds to the predetermined type tag is updated, and if yes, an updated predetermined rule is obtained. As an implementation manner, the predetermined rule may be configured and updated at the browser terminal 301, and may also be delivered to the browser terminal 301 after being configured and updated by the background server 302.

In this embodiment, an example that the predetermined rule is configured and updated by the background server 302 is given. When it is detected that the predetermined rule of extracting the plug-in resource that corresponds to the predetermined type tag is updated, an updated predetermined rule is obtained from the background server 302 of the browser.

Then, the browser parses the webpage to generate a DOM tree, and creates a DOM node for each tag in the webpage script during a DOM tree generating stage. When creating a plug-in tag (embed) node, the browser obtains the plug-in tag node, and determines whether a plug-in tag corresponding to the plug-in tag node is a predetermined type tag according to a type or classid of the plug-in tag node, that is, whether complies with a predetermined protocol specification, and if yes, extracts a plug-in resource that corresponds to the plug-in tag, and transmits the plug-in resource that corresponds to the plug-in tag to a corresponding player for playing.

If it is determined that the plug-in tag corresponding to the plug-in tag node is not the predetermined type tag, the updated predetermined rule is used to match the plug-in resource that corresponds to the predetermined type tag of the webpage script; and after the matching succeeds, the plug-in resource that corresponds to the predetermined type tag is extracted from the webpage script, and the corresponding plug-in resource is transmitted to a corresponding player for playing. If the matching fails, it indicates that extracting the plug-in resource fails.

In this embodiment, by using the foregoing solution, when a user browses a webpage, a browser obtains a DOM node of a tag in a webpage script by parsing the webpage; obtains a plug-in tag node from the DOM node; when a plug-in tag corresponding to the plug-in tag node is a predetermined type tag, extracts a plug-in resource that corresponds to the plug-in tag; and transmits the plug-in resource that corresponds to the plug-in tag to a corresponding player for playing, so that extracting of content that complies with a specific protocol specification can be completed when the webpage has not been truly rendered, thereby improving a speed of extracting predetermined webpage content and also improving a webpage display speed. In addition, because this solution can implement extracting of a plug-in resource on the side of the browser terminal 301 without relying on the background server 302, this solution is technically easy for implementation and can reduce system development costs. In addition, in an application scenario in which a plug-in tag of a predetermined type possibly cannot be obtained in webpage design, resource information of the plug-in tag of the predetermined type is searched for from webpage script resources by using a regular matching method, thereby improving a success rate of extracting webpage resource information, and ensuring reliability of an operation of extracting webpage resource information. Moreover, a predetermined rule may be dynamically configured, that is, may be modified at any time, and when an original webpage resource extracting rule becomes invalid because of an update of a version of a video website, a new regular matching rule may be delivered by using the browser terminal 301 or the background server 302, so as to deal with the problem that an original template becomes invalid due to website revision, thereby improving flexibility of the webpage resource extracting rule.

Figure 10:
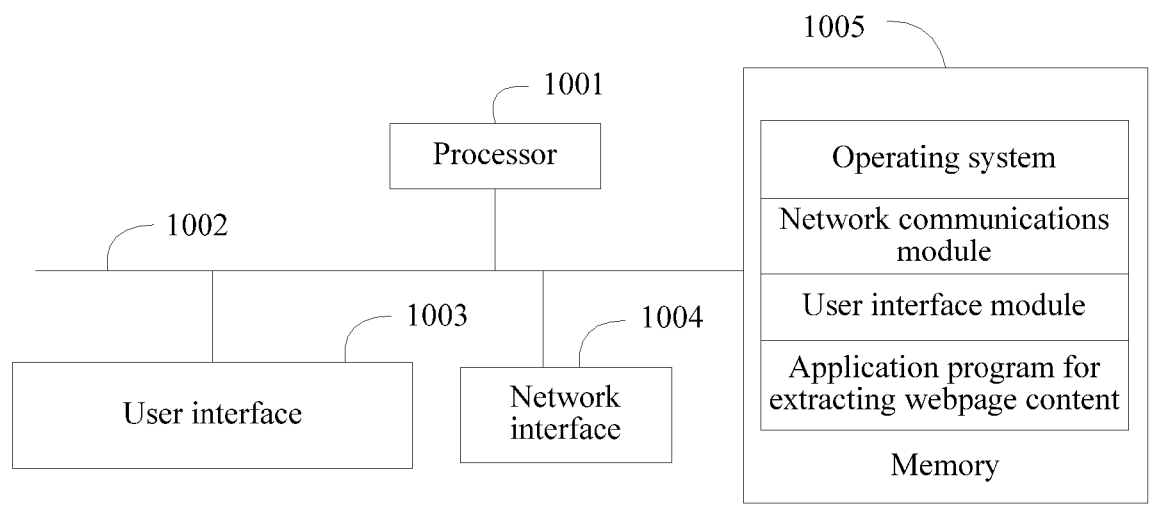
FIG. 10 is another schematic structural diagram of a terminal for extracting webpage content according to an embodiment of the present invention.

As shown in FIG. 10, FIG. 10 is a schematic structural diagram of a terminal for extracting webpage content provided by an embodiment of the present invention.

As shown in FIG. 10, the terminal may include: a processor 1001, such as a CPU, a network interface 1004, a user interface 1003, a memory 1005 and a communications bus 1002. The communications bus 1002 is configured to implement connection and communication between these components. The user interface 1003 may include a display, a keyboard, and optionally the user interface 1003 may further include a standard wired interface and a standard wireless interface. The network interface 1004 optionally may include a standard wired interface and a standard wireless interface (such as a WI-FI interface). The memory 1005 may be a high speed RAM memory, and may also be a non-volatile memory, such as a disk memory. The memory 1005 optionally may further be a storage apparatus that is located away from the processor 1001. As shown in FIG. 10, as a computer storage medium, the memory 1005 may include an operating system, a network communications module, a user interface module and an application program for extracting webpage content.

In the terminal shown in FIG. 10, the network interface 1004 is configured to connect to a server, and perform data communication with the server; the user interface 1003 is configured to connect to a client, and perform data communication with the client; and the processor 1001 may be configured to call the application program, for extracting webpage content, stored in the memory 1005, and perform the following operations:

responding to, by using the user interface 1003, a webpage browsing instruction triggered on a browser by the client to pull a corresponding webpage; parsing the webpage to obtain a DOM node of a tag in a webpage script; obtaining a plug-in tag node from the DOM node; and when a plug-in tag corresponding to the plug-in tag node is a predetermined type tag, extracting a plug-in resource that corresponds to the plug-in tag.

In an embodiment, the processor 1001 may call the application program, for extracting webpage content, stored in the memory 1005 to perform the following operations:

when the plug-in tag corresponding to the plug-in tag node is not the predetermined type tag, matching the plug-in resource that corresponds to the predetermined type tag of the webpage script by using a predetermined rule; and after the matching succeeds, extracting the plug-in resource that corresponds to the predetermined type tag from the webpage script.

In an embodiment, the processor 1001 may call the application program, for extracting webpage content, stored in the memory 1005 to perform the following operations:

detecting whether a predetermined rule for extracting the plug-in resource that corresponds to the predetermined type tag is updated, and if yes, obtaining, by using the network interface 1004, an updated predetermined rule from a background server of the browser; and if not, performing the step of parsing the webpage to obtain a DOM node of a tag in a webpage script.

In an embodiment, the processor 1001 may call the application program, for extracting webpage content, stored in the memory 1005 to perform the following operations:

parsing the webpage to generate a DOM tree; and creating a DOM node, in the DOM tree, for each tag in the webpage script.

In an embodiment, the processor 1001 may call the application program, for extracting webpage content, stored in the memory 1005 to perform the following operation:

transmitting the extracted plug-in resource to a corresponding player for playing.

In this embodiment, by using the foregoing solution, when a user browses a webpage, a browser obtains a DOM node of a tag in a webpage script by parsing the webpage; obtains a plug-in tag node from the DOM node; when a plug-in tag corresponding to the plug-in tag node is a predetermined type tag, extracts a plug-in resource that corresponds to the plug-in tag; and transmits the plug-in resource that corresponds to the plug-in tag to a corresponding player for playing, so that extracting of content that complies with a specific protocol specification can be completed when the webpage has not been truly rendered, thereby improving a speed of extracting predetermined webpage content and also improving a webpage display speed. In addition, because this solution can implement extracting of a plug-in resource on the side of a browser terminal without relying on a background server, this solution is technically easy for implementation and can reduce development costs. In addition, in an application scenario in which a plug-in tag of a predetermined type possibly cannot be obtained in webpage design, resource information of the plug-in tag of the predetermined type is searched for from webpage script resources by using a regular matching method, thereby improving a success rate of extracting webpage resource information, and ensuring reliability of an operation of extracting webpage resource information. Moreover, a predetermined rule may be dynamically configured, that is, may be modified at any time, and when an original webpage resource extracting rule becomes invalid because of an update of a version of a video website, a new regular matching rule may be delivered by using a browser terminal or a background server, so as to deal with the problem that an original template becomes invalid due to website revision, thereby improving flexibility of the webpage resource extracting rule.

It should be further noted that, in this specification, the terms "include", "comprise", and any variants thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Unless otherwise specified, an element limited by "include a/an . . . " does not exclude other same elements existing in the process, the method, the article, or the device that includes the element.

The sequence numbers of the foregoing embodiments of the present invention are merely for the convenience of description, and do not imply the preference among the embodiments.

Through the descriptions of the preceding embodiments, persons skilled in the art may understand that the methods of the foregoing embodiments may be implemented by hardware only or by software and a necessary universal hardware platform. However, in most cases, using software and a necessary universal hardware platform are preferred. Based on such an understanding, the technical solutions of the present invention essentially, or the part contributing to the prior art may be implemented in a form of a software product. The computer software product is stored in a storage medium (such as a ROM/RAM, a magnetic disk, or an optical disc) and includes several instructions for instructing a terminal device (which may be a mobile phone, a computer, a server, a network device, or the like) to perform the methods described in the embodiments of the present invention.

The foregoing descriptions are merely preferred embodiments of the present invention but are not intended to limit the patent scope of the present disclosure. Any equivalent modifications made to the structures or processes based on the content of the specification and the accompanying drawings of the present disclosure for direct or indirect use in other relevant technical fields shall also be encompassed in the patent protection scope of the present disclosure.

What is claimed is:

1. A method for extracting webpage content performed at a terminal having one or more processors and a memory for storing programs to be executed by the processors, the method comprising:

responding to a webpage browsing instruction triggered on a browser by a mobile client to obtain a corresponding webpage;

detecting whether an existing predetermined rule within a script code on the terminal for extracting a plug-in resource that corresponds to a predetermined type tag is updated to facilitate dynamic configuration of the existing predetermined rule by a background server;

at a time when the existing predetermined rule for extracting a plug-in resource that corresponds to a predetermined type tag is updated, obtaining an updated predetermined rule from the background server of the browser, the updated predetermined rule including a regular expression rule;

after obtaining the updated predetermined rule, parsing the webpage to obtain a document object model (DOM) node of a tag in a webpage script;

obtaining a plug-in tag node from the DOM node;

when a plug-in tag corresponding to the plug-in tag node is a predetermined type tag, extracting a plug-in resource that corresponds to the plug-in tag;

when the plug-in tag corresponding to the plug-in tag node is not the predetermined type tag, matching a plug-in resource that corresponds to the predetermined type tag of the webpage script by using the updated predetermined rule; and after the matching succeeds, extracting the plug-in resource that corresponds to the predetermined type tag from the webpage script.

2. The method according to claim 1, wherein the browser supports a plug-in resource protocol that adapts to the updated predetermined rule.

3. The method according to claim 1, wherein the parsing the webpage to obtain a DOM node of a tag in a webpage script comprises:

parsing the webpage to generate a DOM tree; and creating a DOM node, in the DOM tree, for each tag in the webpage script.

4. The method according to claim 1, further comprising:

transmitting the plug-in resource to a corresponding player for playing.

5. A terminal for extracting webpage content, comprising:

one or more processors;

a memory, wherein the memory stores instructions that when executed by the one or more processors cause the one or more processors to:

respond to a webpage browsing instruction triggered on a browser by a mobile client to obtain a corresponding webpage;

detect whether an existing predetermined rule within a script code on the terminal for extracting a plug-in resource that corresponds to a predetermined type tag is updated to facilitate dynamic configuration of the existing predetermined rule by a background server;

at a time when the existing predetermined rule for extracting a plug-in resource that corresponds to a predetermined type tag is updated, obtain an updated predetermined rule from the background server of the browser, the updated predetermined rule including a regular expression rule;

after obtaining the updated predetermined rule, parse the webpage to obtain a DOM node of a tag in a webpage script;

obtain a plug-in tag node from the DOM node;

when a plug-in tag corresponding to the plug-in tag node is a predetermined type tag, extract a plug-in resource that corresponds to the plug-in tag;

when the plug-in tag corresponding to the plug-in tag node is not the predetermined type tag, match a plug-in resource that corresponds to the predetermined type tag of the webpage script by using the updated predetermined rule; and after the matching succeeds, extract the plug-in resource that corresponds to the predetermined type tag from the webpage script.

6. The terminal according to claim 5, wherein the browser supports a plug-in resource protocol that adapts to the updated predetermined rule.

7. The terminal according to claim 5, wherein the instructions are further configured to cause the one or more processors to:

parse the webpage to generate a DOM tree; and create a DOM node, in the DOM tree, for each tag in the webpage script.

8. The terminal according to claim 5, wherein the instructions are further configured to cause the one or more processors to:

transmit the plug-in resource to a corresponding player for playing.

9. Non-transitory storage media, comprising computer program codes for executing a process of:

at a terminal:

responding to a webpage browsing instruction triggered on a browser by a mobile client to obtain a corresponding webpage;

detecting whether an existing predetermined rule within a script code on the terminal for extracting a plug-in resource that corresponds to a predetermined type tag is updated to facilitate dynamic configuration of the existing predetermined rule by a background server;

at a time when the existing predetermined rule for extracting a plug-in resource that corresponds to a predetermined type tag is updated, obtaining an updated predetermined rule from the background server of the browser, the updated predetermined rule including a regular expression rule;

after obtaining the updated predetermined rule, parsing the webpage to obtain a document object model (DOM) node of a tag in a webpage script;

obtaining a plug-in tag node from the DOM node;

when a plug-in tag corresponding to the plug-in tag node is a predetermined type tag, extracting a plug-in resource that corresponds to the plug-in tag;

when the plug-in tag corresponding to the plug-in tag node is not the predetermined type tag, matching a plug-in resource that corresponds to the predetermined type tag of the webpage script by using the updated predetermined rule; and after the matching succeeds, extracting the plug-in resource that corresponds to the predetermined type tag from the webpage script.

10. The non-transitory storage media according to claim 9, wherein the browser supports a plug-in resource protocol that adapts to the updated predetermined rule.

11. The non-transitory storage media according to claim 9, wherein the parsing the webpage to obtain a DOM node of a tag in a webpage script comprises:

parsing the webpage to generate a DOM tree; and creating a DOM node, in the DOM tree, for each tag in the webpage script.

12. The non-transitory storage media according to claim 9, wherein the process further comprises:

transmitting the plug-in resource to a corresponding player for playing.

* * * * *